Aug. 11, 1931.  E. A. ROCKWELL  1,817,942
FLUID PRESSURE TRAPPING DEVICE
Filed Dec. 7, 1927  4 Sheets-Sheet 3
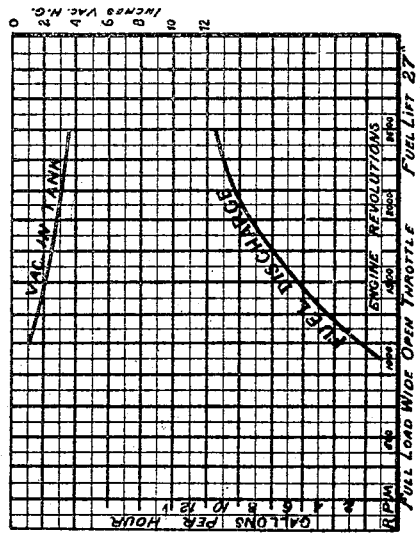
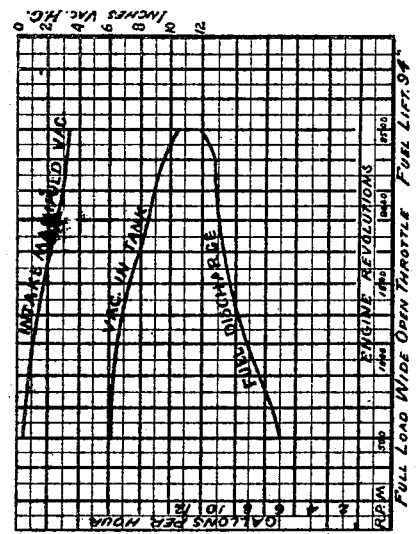
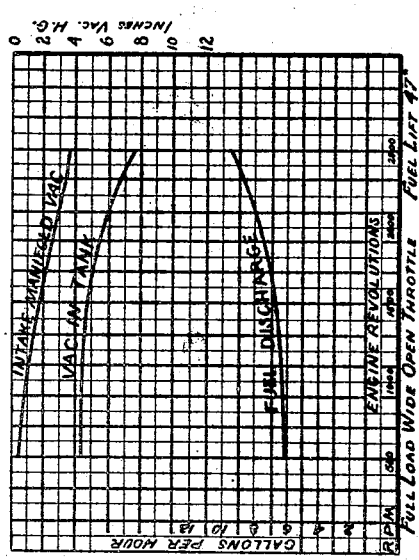
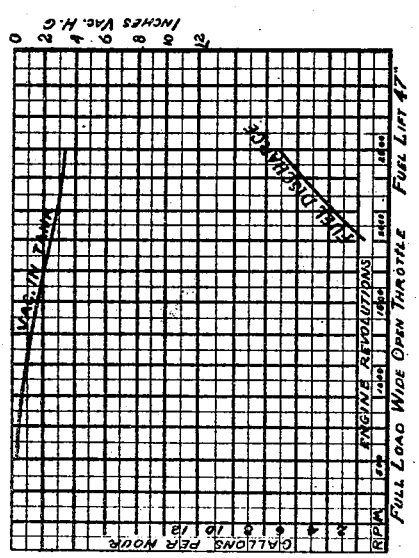
Inventor:
Edward A. Rockwell

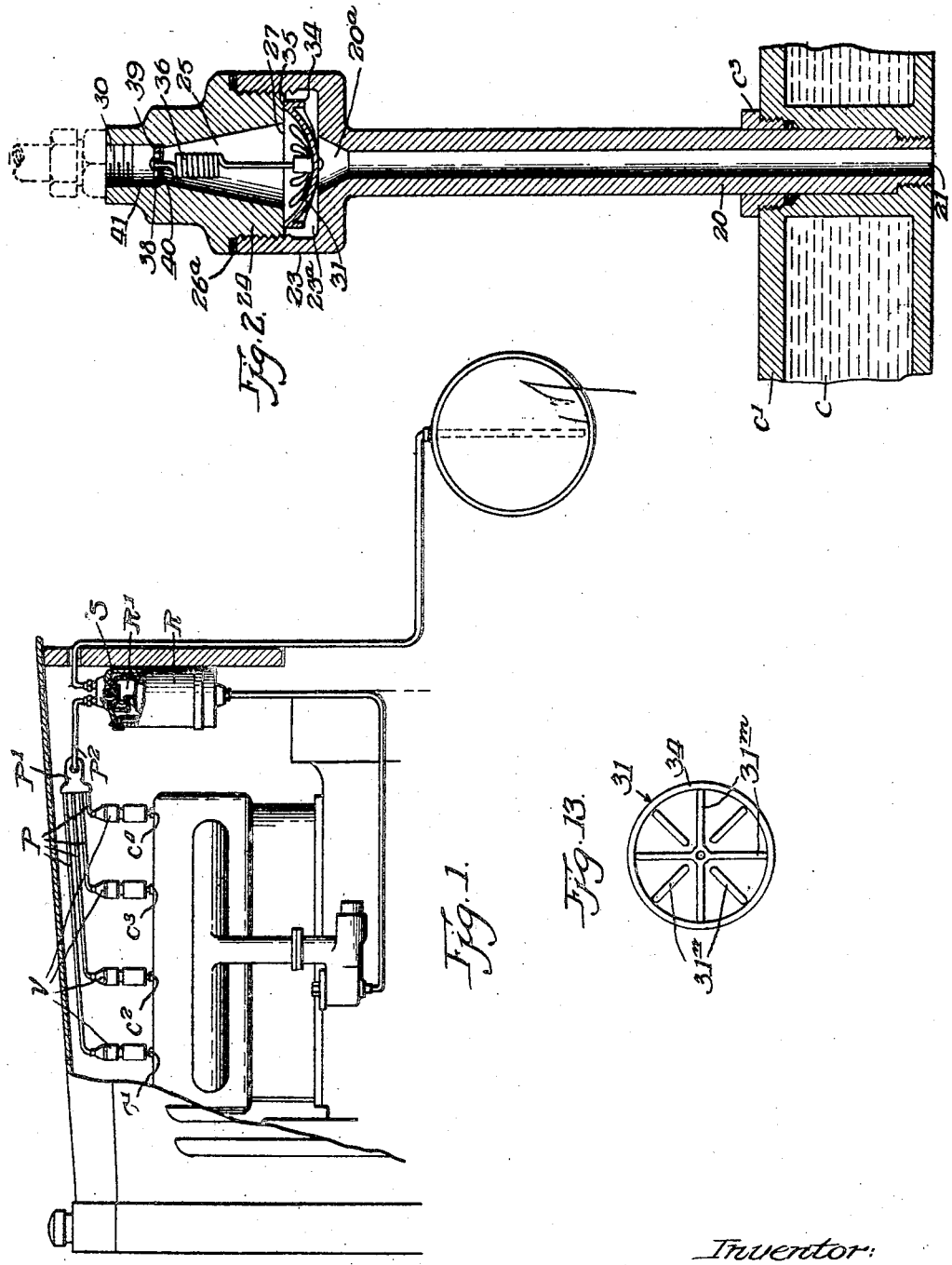

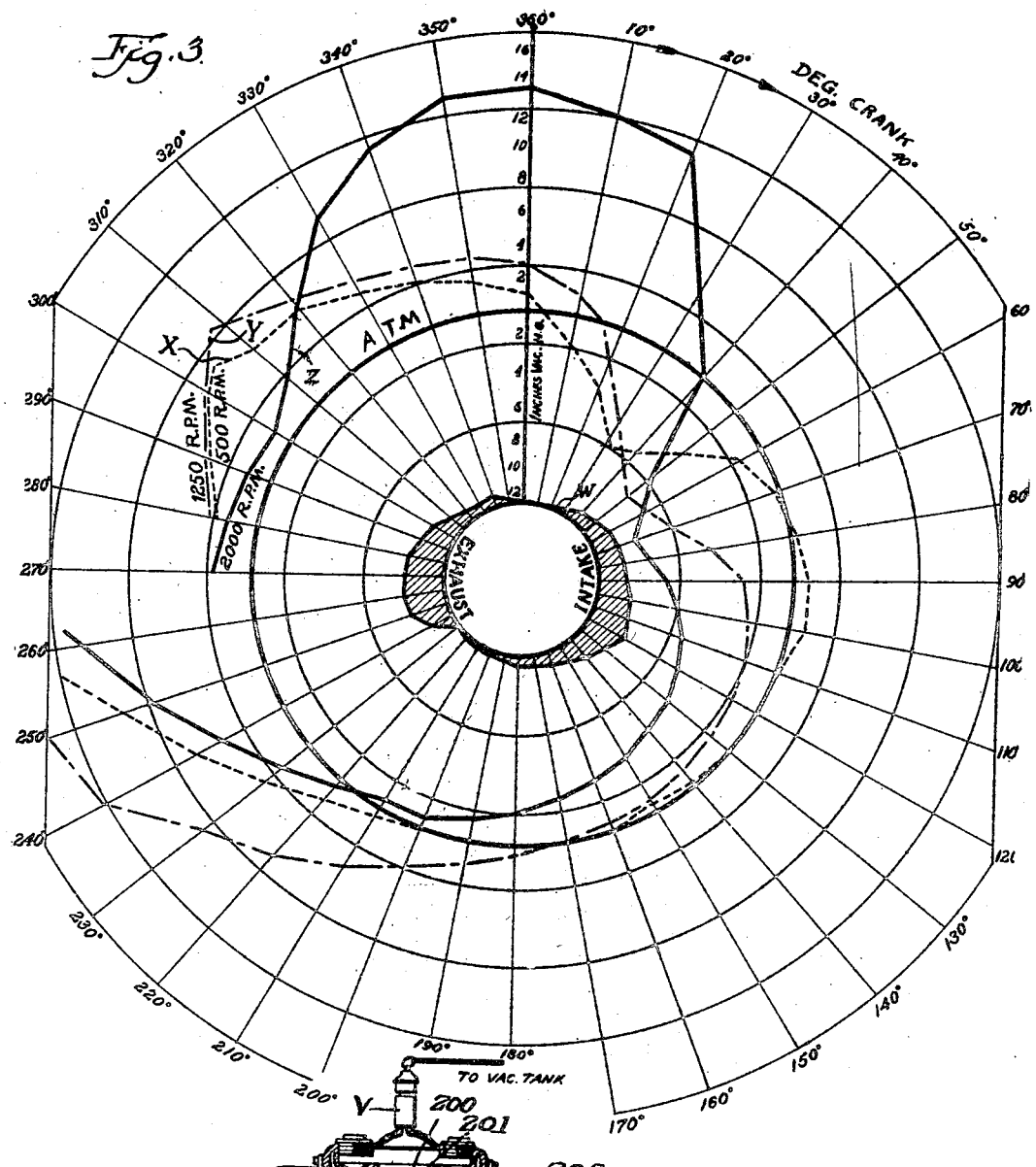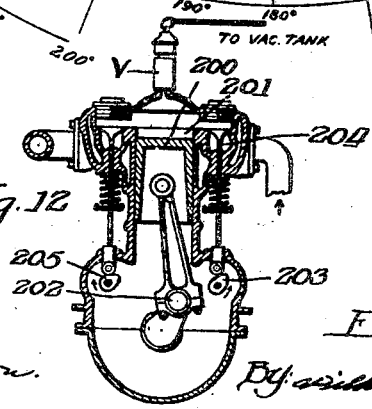

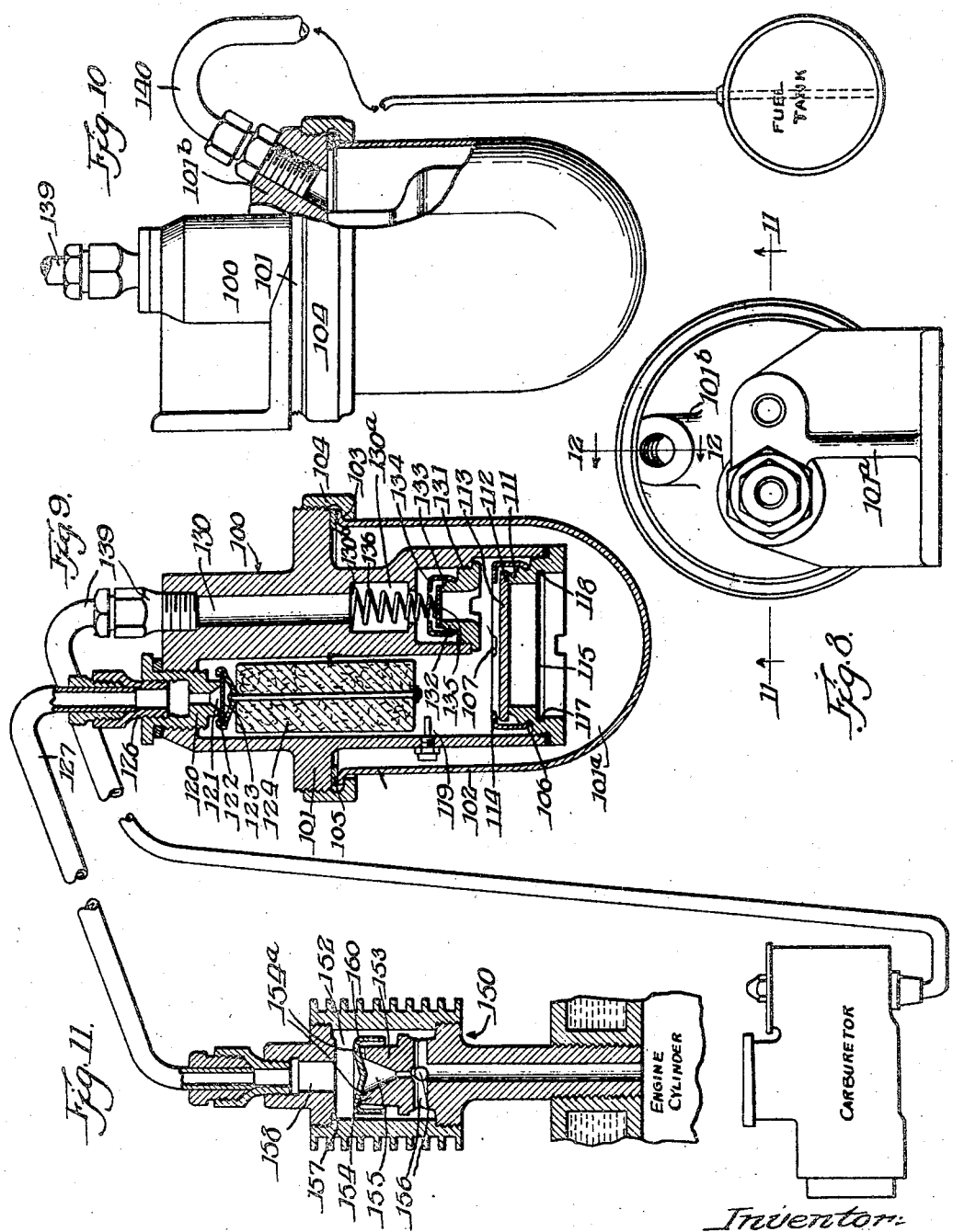

Patented Aug. 11, 1931

1,817,942

UNITED STATES PATENT OFFICE

EDWARD A. ROCKWELL, OF LONG ISLAND CITY, NEW YORK, ASSIGNOR TO STEWART-WARNER CORPORATION, OF CHICAGO, ILLINOIS, A CORPORATION OF VIRGINIA

FLUID PRESSURE TRAPPING DEVICE

Original application filed February 24, 1926, Serial No. 90,229. Divided and this application filed December 7, 1927. Serial No. 238,454.

The purpose of this invention is to provide an improved means and method of utilizing the vacuum developed in the suction phase of the cycle of an internal combustion engine and the like for performing work or operating mechanism extraneous to or disassociated from the engine except as to the connections for deriving the suction from the engine cylinder. It consists in the methods and means for the purpose indicated, shown and described, as indicated in the claims.

This application is a division of my application No. 90,229, filed February 24, 1926.

The invention is herein shown and described as applied to the specific purpose of pumping or lifting the liquid fuel for supplying the engine from a relatively low source to a higher chamber from which it may be supplied to the engine carbureter by gravity.

It is well known that in the intake manifold of an internal combustion engine the vacuum resulting from the intake or suction stroke of the piston is at all times low relative to the maximum vacuum produced in the cylinder, and that when the engine is running with wide open throttle the vacuum in the intake manifold becomes very low, being often inadequate to lift the fuel through the medium of a vacuum filled supply device the distance necessary for supplying the vacuum filled supply device from the main supply tank at the rear of a vehicle whose engine is supplied; this vacuum in the intake manifold under some circumstances falling nearly to atmospheric pressure; and this, notwithstanding the fact that the vacuum in the cylinder at the same time may reach ten inches of mercury or more.

I have discovered that the vacuum in the cylinder is generally maximum at the first part of the suction stroke of the piston, before there is time for the intake valve to respond to the opening means so as to open for admitting fuel mixture, and while the inertia of the mixture itself and friction in the passages causes a lag behind the pull of the piston; and that the vacuum declines from this maximum when the intake valve has been more effectively opened and the mixture movement started, overcoming inertia, so that in the later part of the suction stroke the incoming mixture so nearly overtakes the piston that the vacuum declines from a maximum to perhaps atmospheric pressure.

I have discovered that it is possible to transmit the vacuum produced in any one cylinder or in all the cylinders of a multiple cylinder engine at the maximum which results from the intake stroke of the piston, to a chamber or extraneous cavity which may be in communication for the instant with the engine cylinder, and to "trap" or retain this condition of vacuum in such chamber while the communication with the engine cylinder through which it was transmitted is closed during the remainder of the suction stroke; and that the deficiency of vacuum, or lowering of the vacuum average throughout the suction stroke resulting from the instantaneous transmission or communication of the vacuum to the extraneous chamber, is negligible. To this method I have applied the term "trapping the vacuum" because of the analogy between the method and the method of trapping any fluid. It will be obvious that the momentary or instantaneous connection of a closed chamber with the cavity of the engine cylinder in which, for the instant, there is a high vacuum, the combination being immediately cut off, constituting what I have called "trapping the vacuum", will reduce the pressure in the chamber or produce a condition of partial vacuum therein which will be slight in proportion as the capacity of the chamber is large, but that the repetition of this trapping at the high vacuum stage of each recurring cycle of the engine will build up or accumulate the vacuum in the chamber until it approximates the degree of vacuum existing in the engine cylinder at the instant of communication for trapping the vacuum; and it may be understood, therefore, that in employing this method, for instance for reducing the vacuum in the vacuum chamber of a vacuum tank for lifting liquid fuel from the lower source, the necessary degree of vacuum may be produced in a limited number of cycles of the engine; and that after this limited number of strokes of the piston have occurred, the vacuum thus produced will be maintained by the continued running of the engine.

In the drawings:—

Figure 1 is a diagrammatic view showing an engine equipped with the devices for operating according to this invention in lifting the fuel, all four cylinders of the engine being shown equipped with the proper connections for the purpose.

Figure 2 is a section across one cylinder axial with respect to the connecting fitting, showing the construction of the valve device, referred to as the "vacuum trapping valve", which constitutes the characteristic of the structure of the invention and whose operation is the characteristic of the method.

Figure 3 is a chart showing variation of pressures in the cylinder of an internal combustion engine through one revolution of the crank shaft.

Figure 4 is a chart presenting graphs of the vacuum existing coincidentally in the intake manifold of a 4-cylinder engine and in the vacuum chamber of a vacuum tank which is connected by a device embodying this invention, with one cylinder of the engine, and showing the rate of discharge into the vacuum tank of liquid lifted 47 inches for such discharge, throughout ranges of engine speed for 500 R. P. M. to 2500 R. P. M.

Figure 5 is a chart presenting graphs showing the vacuum in the intake manifold and the rate of fuel discharge into the vacuum tank when the latter is connected for suction with the intake manifold in the usual manner and for fuel lift of 27 inches throughout ranges of engine speed from 2000 R. P. M.,—at which the fuel discharge is zero,—to 2500 R. P. M.

Figure 6 is a chart showing similar graphs when the vacuum tank is connected for suction with the intake manifold in the usual manner and for fuel lift of 47 inches throughout a range of engine speeds from 1000 R. P. M.,—at which the fuel discharge is zero, —to 2500 R. P. M.

Figure 7 is a chart similar to Figure 4 presenting graphs of the intake manifold vacuum and vacuum tank vacuum and fuel discharge throughout ranges of engine speed from 500 R. P. M. to 2500 R. P. M. with a fuel lift of 94 inches, when the vacuum tank is connected for deriving suction from the engine cylinder directly through valve devices embodying this invention, 3 cylinders of the engine being thus connected with vacuum tank.

Figure 8 is a plan view of a vacuum-operated liquid lifting apparatus of a modified type, employing the vacuum trapping valve in modified form.

Figure 9 is a section at the line 9—9 on Figure 8, showing also diagrammatically the connections of the apparatus with the engine cylinder, carburetor and low level fuel source.

Figure 10 is a partly sectional elevation of the same, section being at the plane indicated by the line 10—10 on Figure 8.

Figure 11 is a detail section of a pressure governing valve device desirably employed with the apparatus shown in Figures 9 and 10.

Figure 12 is a diagrammatic view for showing a desirable modification in the form of the valve operating cam of the engine for timing the opening of the intake valve (and closing the exhaust valve) relatively to the commencement of the suction stroke of the piston, for increasing the vacuum at the high vacuum stage of the suction stroke.

Figure 13 is a detail plan view of the valve shown in Figure 2.

In the drawings the engine equipped for operating according to this invention is shown having each of its four cylinders indicated at $C^1$, $C^2$, $C^3$ and $C^4$, equipped with what I term my vacuum trapping valve device, indicated in totality by reference letter, V. The pipes, P, running from these several vacuum trapping valves unite at a fitting, $P^1$, from which the pipe, $P^2$, extends to the vacuum chamber, $R^1$, of the standard type of vacuum tank indicated in totality by the reference letter, R. The specific construction of each of these vacuum trapping valve devices is seen in Figure 2 comprising a tubular stem, 20, adapted to be connected with the engine cylinder as at 21, and terminating in an enlargement at 23 counter-bored to form a valve chamber, $23^a$, and threaded for receiving a plug, 24, axially apertured at 25, and counter-bored at the inner end as seen, forming an enlarged port, 27, and exteriorly reduced for threading and forming a shoulder for stopping the screwing in of the plug at the end of the enlargement, 23, where packing, $26^a$, may be interposed. The plug and the enlargement, 23, serve to form a valve chamber, $23^a$, in which there is positioned a valve member, 31, which is a thin metal stamping dished convex toward the engine and concave toward the plug, 24, and having a reflexed flange, 34, for stiffening the thin disk which has an annular seating face at 35 for seating upon the flat inner end of the plug, 24, encompassing the port, 27, at the entrance to the plug. The valve chamber formed between the inner end of the plug and the bottom of the cavity in the enlargement, 23, is dimensioned for accommodating the valve seated upon the plug for a short range of movement away from its seat before it is stopped on the bottom of the counter-bore, forming the valve chamber where it is stopped without seating for closing the port, $20^a$, at the entrance to the axial cavity of the tubular stem 20. A coil spring, 36, is connected at one end to the center of the dished valve and at the other end to the cross bar, 38, of a ring, 39, which is lodged upon the shoulder, 40, formed by the interiorly threaded counter-bore, 25, at the outer end of the plug, 24, this spring being dimensioned for holding the valve yieldingly seated at the inner end of the plug.

The pipe, P, continuous through the fitting, P¹ with the pipe, P², leading to the vacuum chamber, R¹, of the vacuum tank, as above mentioned, constitute what may be considered as a chamber in which a condition of partial vacuum is built up by successive suction impulses, each communicated during a very short portion of the early part of the suction stroke of the piston, in successive cycles of the engine action; which method of building up the vacuum will continue throughout successive cycles until the degree of vacuum existing in the chamber consisting of the pipe connection to the vacuum tank, approximates the vacuum at the high vacuum stage at which, in each cycle, the valve member, 31, is opened and immediately closed. In the absence of any obstruction of the communication of the pipe connection with the vacuum chamber, R¹, that chamber also constitutes a part of the space in which the vacuum will be thus built up. In the standard construction of vacuum tanks the "suction valve", so-called, seen at S being seated for cutting off the vacuum chamber from the suction conduit, the cavity of the vacuum chamber does not constitute a part of the space in which the vacuum would be built up, except during what are commonly spoken of as "suction intervals" of the operation of the vacuum tank when said suction valve is open. The operation of the structure described is therefore that, starting with all parts of the structure in normal atmospheric pressure condition,—with the suction valve open and the vacuum tank empty in both its chambers, the operation of the engine builds up vacuum in the connecting pipes and the vacuum chamber of the vacuum tank, until, after a limited number of cycles of the engine action, the vacuum produced in the vacuum chamber, R¹, is sufficient to cause the liquid to be lifted from the low level main tank and fill the vacuum chamber, R¹, to the depth causing the float, F, to seat the suction valve, S. When this occurs, the cavity in which the vacuum is being built up through the successive cycles of the engine action is reduced to the space of the pipe connections—from the vacuum trapping device, V, to the vacuum tank, and in consequence, the vacuum will build up in that limited space in a few further cycles of the engine action until the vacuum closely approximates the high vacuum stage in the engine cylinder, which, as mentioned, may closely approximate the cylinder vacuum, and which, as is demonstrated in chart Figure 3, may reach ten inches of mercury.

When the operation of the vacuum tank causes the suction valve, S, to be opened, the high vacuum which has been produced in the connecting pipe during the period of closure of the suction valve is communicated to the vacuum chamber, reduced correspondingly to the increased space through which the condition of vacuum is thus extended; and the method of building up vacuum continues, operating through the increased space while the vacuum chamber is again being filled with liquid, causing the suction valve to be closed, completing the cycle of action of the vacuum trapping device and vacuum tank as co-operating elements of the system.

Chart, Figure 3, is a demonstration of the actual vacuum in the engine cylinder, showing the change from the high vacuum stage in the early part of the suction stroke, to the low vacuum stage, approaching atmospheric pressure at the close of the suction stroke, followed, of course, by condition of super-atmospheric pressure in the return compression stroke of the piston. In this chart which, it will be understood, traces the pressure through one complete revolution of the crank shaft, the several graphs show the changes of pressure at different engine speeds. Graph X, produced by the engine running at 500 R. P. M., it will be observed shows that at the beginning of the suction stroke indicated by the 360° marking of the circle, the pressure in the cylinder corresponded to one inch of mercury, and that at 30° the vacuum or sub-atmospheric pressure was measured by eight inches of mercury; that the vacuum declined to two inches of mercury during the next 30° of the rotation and the pressure became atmospheric, the vacuum zero,—at 80°.

The graph Y corresponding to 1250 R. P. M. indicates that at the commencement of the piston stroke for suction the condition in the cylinder was super-atmospheric, the pressure being measured by two inches of mercury, and became atmospheric after revolution of the crank shaft through 18°, at which point vacuum began to be created, reaching maximum, measured by nearly ten inches of mercury, at 50° of the revolution, the vacuum diminishing,—pressure rising,—from that point quite rapidly to 90° and then slowly to atmospheric pressure, which is reached slightly before the end of a half revolution.

The graph Z corresponding to 2000 R. P. M. shows the super-atmospheric pressure at the commencement of the piston stroke for suction measured by fourteen inches of mercury, pressure being reduced very slowly through the first 20° of revolution and very rapidly between 20° and 40°, at which latter point pressure becomes atmospheric, and condition of vacuum being developed very rapidly from 40° to 70°, of the revolution, at which latter point the vacuum is measured by ten inches of mercury and diminishes,—pressure increasing from that point quite gradually to 220° of the revolution, at which pressure becomes atmospheric and thereafter increases through the compression stroke of the piston.

Upon considering these several graphs it will be seen that the operation above described of the vacuum trapping valve for producing and trapping vacuum in the space beyond the valve, will occur at different parts of the suction stroke of the engine at different engine speeds; but that at all the speeds there is a stage of high vacuum followed by a more or less rapid decline of vacuum throughout the remainder of the suction stroke; and it will be understood that the design of the construction of the vacuum trapping valve device is to take advantage of this high vacuum and decline in a manner already described.

It is generally considered that for any satisfactory operation of a vacuum tank under the least exacting conditions, it must be capable of lifting the fuel 27 inches when the engine is running at a speed of 500 R. P. M., with wide open throttle under full load; and that for fully satisfactory operation the vacuum tank should have lifting capacity of 47 inches under like conditions of engine speed load and throttle opening. The purpose of the charts shown in Figures 4, 5, 6 and 7, is to compare and contrast the operation of a vacuum tank deriving suction for vacuum from the intake manifold of the engine, with the same vacuum tank deriving suction for vacuum directly from a cylinder of the engine through a device embodying this invention.

Chart Figure 4 shows in the three graphs which it contains, the degree and progress of vacuum at the intake manifold and in the vacuum tank respectively; and the resulting liquid discharge through range of engine speed from 500 R. P. M. to 2500 R. P. M. when the lift is 47 inches when the vacuum tank derives suction through a device embodying the present invention. And from this chart, it will be seen, that at 500 R. P. M. the vacuum in the intake manifold is measured by about ½ inch of mercury, and that at that stage of speed the vacuum in the tank is measured by about 5¾ inches mercury; and that the liquid discharge at that stage of vacuum and with a lift of 47 inches is 8 gallons per hour, increasing to 9½ gallons, 10⅕ gallons, 10⅗ gallons and 11⅖ gallons per hour as the speed increases to 1000 R. P. M., 1500 R. P. M., 2000 R. P. M., and 2500 R. P. M., respectively, the vacuum in the tank increasing slowly (as does also the vacuum in the intake manifold) to vacuum measured by 9 inches mercury at 2500 R. P. M., while the fuel discharge with a lift of 47 inches increases steadily to 10¼ gallons per hour at 2500 R. P. M.

By reference to chart Figure 5, which shows fuel discharge and tank vacuum with 27 inch fuel lift throughout changes of speed marked, when the tank is connected for vacuum with the intake manifold, in the usual manner, it will be seen that the fuel discharge becomes zero when the engine speed falls to 1000 R. P. M. That is to say, the vacuum tank is inoperative for lifting fuel 27 inches at any speed below 1000 R. P. M., and of course fails to supply adequate fuel for maintaining the operation of the engine sometime before the speed declines to 1000 R. P. M. And by examination of chart, Figure 6, giving the corresponding showing with 47 inch fuel lift, it is seen that with that lift, the vacuum tank deriving suction from the intake manifold, is inoperative at less than 2000 R. P. M. and fails to give any adequate fuel supply for maintaining the engine sometime before the speed declines to that figure. Comparing chart Figure 6 with chart Figure 4 which shows the corresponding experience when the vacuum tank is connected with a device embodying the present invention deriving suction from one cylinder of the engine, it will be seen that it is fully operative for lifting fuel 47 inches at the lowest speed,—500 R. P. M., the fuel discharge at that speed being 6 gallons per hour. That is to say, the maximum required lift in automobile service is obtained at the conventional "low speed" 500 R. P. M., the vacuum at that speed being,—measured in inches of mercury,—seven times the intake manifold vacuum.

Chart Figure 7 shows the fuel discharge obtained with 94 inch fuel lift when the vacuum tank derives suction through a device embodying this invention from 3 cylinders of the engine, the fuel discharge at the lowest speed, 500 R. P. M., being 6 gallons per hour, which is adequate for driving the engine under maximum load.

It will be understood that the purpose of dishing the vacuum trapping valve member, 31, is to adapt it to resist the pressure of the engine gases in the pressure and explosion phases of the engine cycle withiut being made so thick, and thereby so heavy, as to defeat the quick action which is necessary for the trapping function. The desired stiffness with lightness is carried to a high degree by corrugating the valve radially as shown in Figure 13 which shows relatively longer radial corrugations, $31^m$, at 90° angular intervals, and relatively shorter radial corrugations, $31^n$, at an outer annulus at 45° angular intervals. And for the same purpose the peripheral flange, 34, which is provided for stiffening, as already mentioned, is desirably formed in immediate continuation of an annular corrugation, $33^m$, which operates to stiffen the valve against circumferential distortion which the radial corrugations might tend to promote.

With the same purpose of insuring quick action of the valve for which it is adapted by its lightness, the spring, 36, when of the spiral form shown (to which I do not limit myself) is desirably made to comprise few rather than many coils, and these of small rather than large diameter. The small number of coils causes the tension to increase rapidly in the short opening movement of the valve which stretches the spring, though the spring exerts very slight pressure on the valve at its seated position so that it yields quickly to the suction for opening, and reacts very quickly and strongly for closing.

In Figures 8, 9, 10 and 11 there is shown a modified type of vacuum-operated fuel lifting device in which the vacuum trapping valve is comprised in the fuel lifting structure itself. This structure comprises a cast body member, 100, having an encompassing flange, 101, intermediate its upper and lower ends for holding a cup or bowl member, 102, which is a sheet metal stamping having at its upper end an exteriorly projecting flange, 103, by means of which the bowl is clamped onto the flange, 101, by a coupling ring, 104, for receiving which the flange, 103, is peripherally threaded, packing, 105, being interposed between the flanges of the bowl and body for making the junction fluid-tight. The bowl thus constitutes a chamber, 101ª, into which the body member, 100, protrudes downwardly with space around and below it for the liquid which is to be lifted from a low level source by suction operating through the passages of the body member, 100 as will be described. Said body, 100, is cylindrical at the lower part and open at the lower end, and interiorly threaded for having screwed into it an annular valve seat member, 111, which at its upper end affords a valve seat at 112 for a light disk valve, 113, which is retained above the seat by a valve check ring, 114, clinched onto the valve seat member, 111, at a diametrically reduced annular shoulder thereof as seen at 106. Extending up above the valve seat, 112, this ring has three lugs, 107, folded inwardly for overhanging the valve at a sufficient distance above the valve seat, 112, to allow the valve a short range of movement away from its seat. 115 represents a strainer which is desirably interposed at the lower end of the valve seat member, being retained by a split ring, 117, for which a groove is formed in the inner surface of the valve seat member as seen at 118.

From the cylindrical chamber, 110, a cylindrical float chamber, 119, leads upwardly in the body member, 100, being terminated at the upper end by a plug, 120, screwed in at the upper end of the body, 100, said plug being axially apertured and counterbored at the lower end within the float chamber, 119, forming an enlarged port, 121, encompassed by a seat, 122, formed at the lower end of the plug for seating a disk valve, 123, which is carried at the upper end of a float, 124, the float being fitted loosely but with slight lateral clearance in the chamber, 119. The plug, 120, is counterbored and threaded at its upper end for receiving a pipe coupling, 126, by which a pipe, 127, leading from a cylinder of the engine to be served is connected with the float chamber, 119. Alongside the float chamber there is formed, leading up from the chamber, 120, in the body, 100, a passage, 130, which is counterbored at 130ª to form a shoulder, 130ᵇ, and further counterbored at the lower end and threaded as seen at 131 for receiving, screwed into it, a valve seat member, 132, which has at its upper end a valve seat, 133, and intermediate its ends is formed similarly to the valve seat member, 111, for carrying a valve check member, 134, similar to the valve check ring, 114, for checking the opening movement of a check valve, 135, which co-operates with the valve seat, 133. A spring, 136, stopped at its upper end on the shoulder, 130ᵇ, reacts at its lower end on the valve, 135, for yieldingly holding the latter seated in addition to gravity. At the upper end the passage, 130, is threaded for a pipe connection, 139, leading to the carbureter of the engine to be served. The body, 100, above the plane of the flange, 101, is of less cross section than at and below that plane; and the excess cross area is closed by a top web, 101ª, in the plane of the flange, 101; and this web has a boss seen at 101ᵇ, bored and threaded for connecting a pipe, 140, leading from a low level source of liquid fuel to be lifted by the apparatus into the chamber formed by the bowl, 102, to be delivered thence through the passage, 130, and pipe, 139, to the carbureter.

The operation of this apparatus in the suction phase of the engine cycle is as follows:

All the chambers of the apparatus being empty and the float, 124, at a low position in its chamber, and the valve, 123, thereby off its seat, at the high suction stage of the suction phase of each cycle of the engine, the valve, 113, is lifted from its seat, and immediately dropped again as the suction is relieved by the access of air past the valve, and also as the suction in the engine cylinder declines. This action is repeated at each suction phase of each succeeding cycle of the engine, building up a condition of partial vacuum in the bowl chamber, 101ª, by means of which liquid is lifted through the pipe, 140, and pours into the bowl chamber, filling it to the level of the valve, 113, past which it is drawn at each succeeding cycle thereafter, until the float chamber, 119, is filled and the float, 124, is lifted, seating the valve, 123, and preventing further access of suction, but permitting access of a limited pressure in the pressure stroke of the engine piston, governed as hereinafter explained, so that it is only sufficient to force the liquid up past the valve, 135, through the passage 130, and pipe, 139, to the carbureter.

It will be seen, therefore, that in this construction the valve, 113, operates for trapping the vacuum at high vacuum stage of the suction phase of the engine cycle, substantially as the valve member, 31, of the construction first above described.

The expedient and device for limiting the access of pressure from the engine cylinder in the compression phase of the engine cycle constitutes no part of the present invention but may be briefly described to enable the drawings to be understood. For this purpose there is interposed in the pipe line leading from the vacuum-operated lifting apparatus shown in Figures 8, 9 and 10, and preferably connected directly to the engine cylinder, as shown in Figure 11, a fitting, 150, affording communication through its stem with the engine cylinder, and comprising the valve chamber, 152, in which there is a centrally protruding boss, 153, terminating in a valve stop, 154, which encompasses the port, 155, which terminates the axial passage of the fitting leading from the engine cylinder. The stop, 154, is preferably notched as seen at 154ª, so that it does not constitute a complete seat, but only a stop for the valve. This boss has radial passages, 156, leading from its axial passage and discharging in the valve chamber for by-passing the valve stop and the valve, 160, which is in the form of an inverted cup overhanging said stop and normally lodged thereon by gravity, said valve having a limited range of movement away from the stop to a seat, 157, which is formed protruding from the upper side of the valve chamber encompassing the port, 158, at which the pipe, 127, is connected for leading to the suction-operated lifting device shown in Figures 8, 9 and 10. The operation of this pressure-governing valve device is that at the beginning of the pressure phase of the engine cycle the valve, 160, is thrust up from the stop, 154, and seated at the upper seat, 157, allowing the fluid pressure from the engine to pass it only during the very brief interval between the access of said pressure under the inverted cup valve and the seating of said valve at the upper seat, where the valve remains held by pressure throughout the entire pressure phase of the engine cycle. At the suction phase, the transverse passages, 156, permit relatively free access of air or gas to the engine cylinder,—that is, they enable the engine suction to be transmitted through the pipe, 127, to the suction lifting apparatus shown in Figures 8, 9 and 10 as already described.

Upon considering the graphs of chart Figure 3, and observing the varying relations of the peak point of suction at the several speeds, to the suction stroke of the piston and the valve lift from its seat, as shown at graph W, it may be understood that the degree of vacuum produced in the cylinder at the vacuum peak, and the point in the suction stroke of the piston at which the peak occurs, may be modified, and particularly that the degree of vacuum may be materially increased, by modification of the form of the inlet-valve-operating cam; and that by forming this cam so that the inlet valve shall not begin to open until the piston has withdrawn a substantial distance from the head of the cylinder, almost a perfect vacuum may be produced before the valve opens at all; and that the increasing rate of the piston's movement at and immediately after the beginning of the opening movement of the valve, may maintain the vacuum at a high point throughout as many degrees of the revolution of the crank shaft as desired.

Accordingly, in any instance in which by reason of acceptable fuel lift being required, or by reason of the necessity for moving the fuel along horizontally from the source to reach the vacuum tank, or in any instance in which the proportions of the engine cylinders and valves tend to shorten the high vacuum stage of the suction stroke, the engine valve-operating cams may be modified so as to give at the peak any necessary degree of vacuum, and cause it to be maintained at any effective degree through a sufficient arc of the crank shaft revolution to permit the vacuum to be trapped by the vacuum trapping valve for building up the needed vacuum in the conduit leading to the vacuum chamber of the vacuum tank, and in that chamber.

This is illustrated diagrammatically in Figure 12, showing the piston 200 in the engine cylinder 201 withdrawn a substantial distance from the cylinder head, the crank 202, being about 30° past the center, while the inlet-valve-operating cam, 203, is just at the point of beginning to open the inlet valve, 204, which has theretofore remained closed while the piston has been withdrawing the distance shown from the cylinder head, and thereby tending to produce an almost perfect vacuum which is trapped by the vacuum trapping valve 31 or 13.

Upon consideration of the vacuum trapping function of the device described, either in the form shown in Figure 2, or in the form shown in Figure 9, it will be recognized that an important element in the value of this vacuum trapping expedient and device as compared with making the suction connection of a vacuum tank to the intake manifold, is, that by reason of the negligible amount of air admitted to the cylinder in the short instant of trapping, the mixture proportions are not materially affected, a consideration of special importance when the engine is idling; and that this desirable characteristic of the operation is obtained by the limitation of the admission of air to the cylinder during the brief instant of trapping the vacuum being affected not by the restriction of the air passage, but by the restriction of the time during which the valve can remain open; and it will be seen that for so restricting the length of the open period, the distance which the valve has to move in opening and closing must be short relatively to the flow capacity of the port during the open period. In the construction shown, it may be noticed that the area of the port which the valve controls is very large in comparison with the range of movement of the valve from fully open to completely seated position, the diameter of the port being approximately twenty times said range of movement of the valve. The operation in the manner described and for the purpose stated is not dependent upon establishing any exact mathematical ratio between these two dimensions, because the promptness of the valve's movement from either seated or open position is affected by its weight and consequent inertia, as well as by the degree of pressure operating to move it. But it is quite certain from the demonstrations which have been made of constructions of this character that for practical purposes in any practically operative construction of this character, and attached to a cylinder of an internal combustion engine of common type, and with the valve made of material and dimensioned for rendering it as light as possible relatively to its area consistently with necessary stiffness, the area of the port must be equal to that of a circle whose diameter is at least five times the distance of the valve movement from open to seated position, in order that the construction may operate for trapping the vacuum according to the method and principle of my present invention.

I claim:

1. The method which comprises doing work by means of suction taken off from a cylinder of an internal combustion engine during a short portion of a relatively high stage of the suction, independently of the operation of the suction for drawing the fuel charge into the cylinder.

2. The method which comprises doing work by means of suction taken off from a cylinder of an internal combustion engine during the highest stage of the suction, independently of the operation of the suction for drawing the fuel charge into the cylinder.

3. The method which comprises doing work by means of suction taken off from a cylinder of an internal combustion engine during a short portion of a relatively high stage of the suction independently of the operation of the suction for drawing the fuel charge into the cylinder, the suction so taken off being trapped and accumulated at successive cycles in the operation of the engine for accomplishing said work.

4. The method which comprises doing work other than for drawing the fuel charge into the engine, by means of suction taken off from a cylinder of an internal combustion engine at a relatively high stage of suction therein, and cutting off said suction at a lower stage of suction in said cylinder.

5. The method of utilizing the suction developed in the suction phase of the cycle of an internal combustion engine and the like for a function other than drawing the fuel charge into the cylinder, which consists in providing communication for the suction which is opened at a stage of relatively high suction and automatically closed at a succeeding stage of lower suction.

6. The method of utilizing the suction developed in the suction phase of the cycle of an internal combustion engine and the like, for a function other than drawing the fuel charge into the engine cylinder, which consists in providing communication for the suction which is opened in the earlier part of the suction stroke of the piston and automatically closed at a later part of the same stroke.

7. The method of utilizing the suction developed in the suction phase of the cycle of an internal combustion engine and the like for a function other than drawing the fuel charge into the engine cylinder, which consists in providing communication for the suction which is opened in the suction stroke of the piston before the opening of the intake valve is fully effective for admitting the fuel charge and which is closed automatically at a later part of the same stroke.

8. The method of producing a condition of partial vacuum in a chamber for lifting liquid from a low level source to such chamber at the higher level which consists in trapping the vacuum of an engine cylinder at its high stage in a conduit connected with the vacuum chamber.

9. The method of trapping the vacuum of an engine cylinder at its high stage, which consists in exposing to the engine suction, for withdrawing from its seat in a conduit communicating with the engine cylinder, a valve of large area and light weight having peripheral air clearance around it for the air to be drawn toward the high vacuum region.

10. The method of communicating vacuum of the cylinder of an internal combustion engine at the high vacuum stage to the vacuum chamber of a liquid lifting device, which consists in trapping the cylinder vacuum at its high stage in a conduit between the cylinder and the vacuum chamber, and trapping the vacuum of the conduit at its high stage in the vacuum chamber.

11. The method of utilizing the vacuum of the cylinder of an internal combustion engine for producing a condition of high vacuum in the vacuum chamber of a vacuum operated apparatus, which consists in trapping the cylinder vacuum at the high vacuum stage of each cycle of the engine.

12. The means of utilizing the suction developed in the suction phase of the cycle of an internal combustion engine and the like, comprising a passage leading from the engine cylinder; a chamber to which said passage leads; a valve in said passage; a port at which said valve seats at the side remote from the engine cylinder, the seat of the valve encompassing said port and enclosing an area equal to that of a circle of a diameter at least five times the range of movement of the valve from open to seated position.

13. The means for utilizing the suction developed in the suction phase of the cycle of an internal combustion engine and the like, comprising a passage leading from the engine cylinder; a chamber to which said passage leads; a valve in said passage; a port at which said valve seats at the side remote from the engine cylinder; means holding said valve normally yieldingly seated for obstructing communication between said chamber and the engine cylinder through said port, said valve having its seat encompassing said port and enclosing an area equal to that of a circle of a diameter at least five times the range of movement of the valve from open to seated position.

14. The means for utilizing the suction developed in the suction phase of the cycle of an internal combustion engine and the like, comprising a passage leading from the engine cylinder; a chamber to which said passage leads; a valve in said passage; a port at which said valve seats at the side remote from the engine cylinder, the seat of the valve encompassing said port and enclosing an area equal to that of a circle of a diameter at least five times the range of movement of the valve from open to seated position; the valve being thin for rendering it light in weight relatively to its port-closing area.

15. The means for utilizing the suction developed in the suction phase of the cycle of an internal combustion engine and the like, comprising a passage leading from the engine cylinder; a chamber to which said passage leads; a valve in said passage; a port at which said valve seats at the side remote from the engine cylinder, the seat of the valve encompassing said port and enclosing an area equal to that of a circle of a diameter at least five times the range of movement of the valve from open to seated position, and having its seating area formed by a peripheral flange rendering the valve dished, whereby it is rendered stiff for enduring the pressure of the compression and explosion phase of the engine cycle.

16. In the construction defined in claim 12, a spring tending to seat the valve lightly against the pressure, whereby the seating action of the valve upon reduction of pressure is quickened.

17. In the construction defined in claim 12, the valve device being adapted for connection with the engine cylinder for exposure both to the suction and to the pressure phases of the engine cycle, the valve member being dished in form convex toward the engine connection for withstanding the fluid pressure upon the compression and explosion phases of the engine cycle.

18. In the construction defined in claim 12, the valve being adapted for connection with the cylinder of an internal combustion engine for exposure to the fluid pressure in all phases of the engine cycle, the valve member being thin and formed convex toward the engine connection with corrugations struck outwardly from its convex surface for stiffening the valve to resist the fluid pressure in the pressure phase of the engine cycle.

19. In combination with an internal combustion engine, the means of supplying the same with fuel comprising a tank at a low level from which the fuel may be lifted, a chamber at a higher level positioned for supplying the engine carbureter by gravity, a conduit leading from the intake end of the engine cylinder to and communicating with the upper part of the elevated chamber, said conduit comprising a valve chamber, and a valve therein, the chamber having ports at opposite sides of the valve, the port at one side leading from the engine cylinder, the valve being arranged for seating at the other port, and for such seating having a peripheral flange whose edge constitutes the seating face of the valve and which seats encompassing the port, said encompassed area equal to that of a circle of a diameter at least five times the range of movement of the valve from open to seated position, said valve chamber being dimensioned for full clearance around the valve for transmission of fluid pressure past the valve upon the opening of the latter.

20. In combination with an internal combustion engine, the means of supplying the same with fuel comprising a tank at a low level from which fuel may be lifted; a chamber at a higher level positioned for supplying the engine carbureter by gravity; a conduit leading from the engine cylinder to and communicating with the upper part of the elevated chamber; said conduit comprising a valve chamber with ports toward the engine and toward the elevated chamber respectively; a valve in said valve chamber having an annular seating phase arranged for seating, encompassing the latter port, the encompassed area equal to that of a circle of a diameter at least five times the range of movement of the valve from open to seated position, the valve having such short range of movement toward and from its seat, with clearance for fluid pressure around the seating annulus; whereby the high suction stage of the suction phase of the engine cycle followed by the lower stage of suction, causes the pressure fluid to pass around the valve, causing higher vacuum beyond it than at the side at which the suction originates after the suction has declined, and said higher suction operates to reverse the valve movement during the lower suction stage.

21. The method of producing a source of vacuum for operating an auxiliary apparatus associated with an internal combustion engine which consists in providing a communication to an engine cylinder which is automatically opened for sucking the air from the communication into the engine cylinder during a relatively short period of the highest degree of suction existing in the engine cylinder during the stroke of the piston and automatically closed during a lower degree of suction in the engine cylinder whereby the vacuum which is trapped in the communication leading to the engine cylinder approaches the highest degree of suction and is sufficient to operate the auxiliary apparatus throughout the running speeds and loads upon the engine.

22. The method of producing a high degree of vacuum for operating an auxiilary apparatus associated with an engine cylinder which consists in timing the movements of the intake and exhaust valves associated with an engine cylinder for controlling the fuel mixture so that a high degree of suction is produced in the engine cylinder during a short portion of the stroke of the piston and providing a communication leading to the engine cylinder, automatically opened during the period of high suction in the engine cylinder and automatically closed thereafter to trap the high degree of vacuum in the communication.

In testimony whereof, I have hereunto set my hand at Chicago, Ill., this 2 day of Dec., 1927.

EDWARD A. ROCKWELL.